No. 739,400. PATENTED SEPT. 22, 1903.
E. W. DEMING.
PROCESS OF CLARIFYING SACCHARINE OR OTHER SOLUTIONS.
APPLICATION FILED MAR. 31, 1902.
NO MODEL.
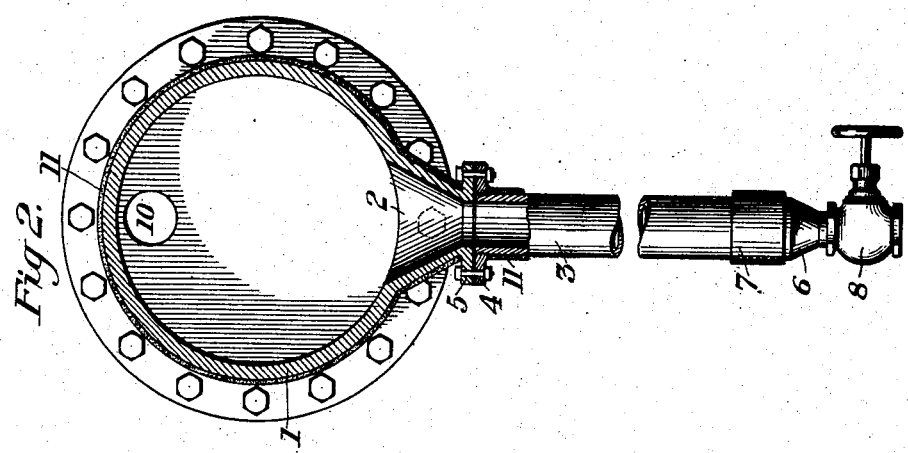
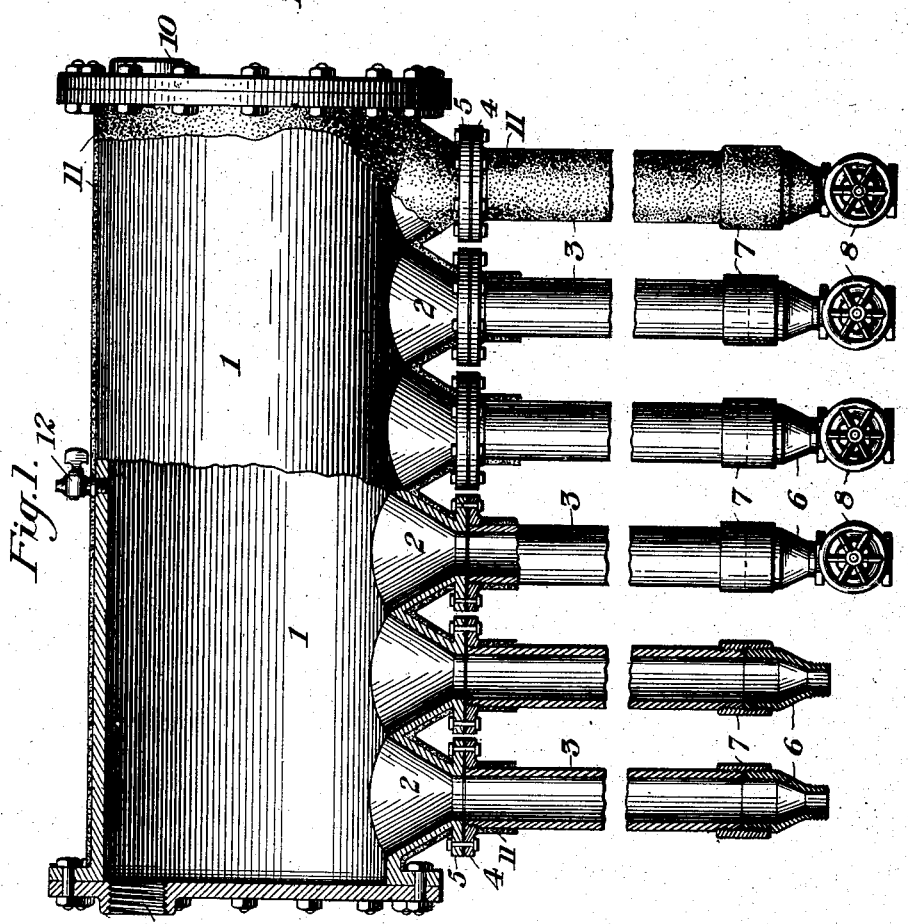

No. 739,400. Patented September 22, 1903.

UNITED STATES PATENT OFFICE.

EUGENE WATSON DEMING, OF NEW ORLEANS, LOUISIANA.

PROCESS OF CLARIFYING SACCHARINE OR OTHER SOLUTIONS.

SPECIFICATION forming part of Letters Patent No. 739,400, dated September 22, 1903.

Application filed March 31, 1902. Serial No. 100,818. (No specimens.)

*To all whom it may concern:*

Be it known that I, EUGENE WATSON DEMING, a citizen of the United States, residing at New Orleans, in the State of Louisiana, have invented certain new and useful Improvements in Processes of Clarifying Saccharine or other Solutions, of which the following is a specification.

This invention relates to an improved process of treating solutions to remove impurities held in suspension therein, and is especially intended for the treatment of saccharine solutions to separate therefrom the solid particles which are coagulated by heat and the reagents commonly used in the earlier stages of the process of defecation. According to this process the saccharine solution brought from any source of supply—for example, the digester and superheater shown in my Patent No. 531,460—is carried along a passage beneath which is a series of successive collecting-chambers, the rate of flow, temperature, and pressure being so regulated that the heavy impurities subside into the first collecting-chamber, while each successive chamber receives lighter materials.

The process is preferably carried out in the apparatus shown in the accompanying drawings, in which—

Figure 1 is a side elevation, partly in section; and Fig. 2 is a transverse section.

The apparatus comprises a horizontal manifold 1, along the bottom of which is a series of conical outlets 2, each outlet communicating with a vertical tubular collecting-chamber 3. The body of the manifold and the conical outlets are preferably cast in a single piece, and each collecting-chamber, which may consist of wrought-iron pipe, has at its upper end a flange 4, bolted to a similar flange 5 at the lower end of the passage 2. The lower end of each collecting-chamber consists of a tapering neck 6, secured to the tubular chamber by a threaded sleeve 7 and carrying at its lower end a discharge-valve 8. Each end of the manifold is provided with a head, secured thereto by flanges and bolts. The heads of the manifold have, respectively, suitable inlet and outlet openings 9 10 near the upper part of the manifold-chamber. Both the manifold and collecting chambers are shown covered with a layer of non-conducting material 11 to retain the heat in the solutions. The manifold and collecting chambers may also for certain purposes be provided with steam or water jackets. In the use of this apparatus in sugar-houses the solution to be clarified—taken, for example, from the digester and superheater—enters through inlet 9 under a temperature considerably above its atmospheric boiling-point—for example, from 220° to 270° Fahrenheit—and under a corresponding pressure. The pressure in this apparatus may in some cases be desirably maintained at a considerably higher point than that necessary to prevent ebullition.

The coagulated impurities in the solution from the digester and superheater may be said to exist in three general forms—one portion consisting of a relatively heavy granular precipitate which readily settles to the bottom of the tank; a second portion which would accumulate on the surface of the solution if boiled in an open tank, but of such specific gravity as to readily precipitate from a quietly-moving body of the solution, and a third portion in the form of a fine feculent substance, which it is usually very difficult to precipitate or remove. The heavier impurities settle into the first collecting-chamber, while lighter impurities pass on and settle into successive chambers, the fully-clarified solution finally escaping through outlet 10. The length of the manifold and the number of collecting-chambers are thus conditioned by the amount and nature of the impurities to be removed. The solid matter in the collecting-chambers is removed from time to time or continuously through the valved outlets 8 and may pass thence to the filter-presses, the expressed liquid being added to the clear liquid drawn from the settling-tank.

The process is preferably carried out with a continuous flow through the manifold; but this is not essential, and the flow may be intermittent. Even if the flow be intermittent the sedimentation proceeds during the forward movement of the solution. The nonconducting material shown on the manifold and collecting chambers may in some cases be omitted.

In treating saccharine solutions, and in some cases in treating non-saccharine solutions, it is of advantage to heat them to reduce the viscosity, the settling being thereby greatly facilitated.

The method which consists in superheating under pressure a body of liquid to coagulate impurities contained therein and settling said impurities from a moving body of such liquid while still under pressure possesses an important advantage. Under the action of the high temperature the impurities are coagulated in a dense and heavy form. If thereafter the pressure be relieved while the impurities are still suspended in the liquid, there results a liberation of gas throughout the body of the liquid, and such gas adhering in the form of bubbles to the suspended impurities reduces their specific gravity to such extent as to render their separation by gravity practically impossible. By maintaining the liquid under pressure, however, such liberation of gas-bubbles is avoided and the impurities settle readily, leaving the body of the liquid clear. By maintaining this pressure in a moving column of the liquid there results a continuous process, with its well-known advantage and economy.

The separate collection of heavier and lighter impurities possesses several advantages. In the treatment of many liquids such separate collection corresponds to an actual reduction of the quantity of the material to be subsequently handled by the filter-presses or analogous devices, for the reason that some grades of the material will be so nearly valueless that they may be discarded. Furthermore, in all cases, and more particularly in the treatment of sugar solutions, there exists a marked difference in the facility with which the heavier and lighter impurities are handled by the presses. The heavier and more granular portions of the precipitate are filtered off with comparative ease, and the capacity of the presses is greatly increased by their separate collection and treatment. The construction of the apparatus offers the further advantage that it comprises a unit which is capable of indefinite multiplication to provide a settling-tank of any desired capacity.

I claim—

1. The herein-described method, which consists in heating a liquid containing impurities under pressure to a temperature above its atmospheric boiling-point, and settling impurities from a moving column of said liquid while retaining it under pressure, as set forth.

2. The herein-described method, which consists in heating a liquid containing impurities under pressure to a temperature above its atmospheric boiling-point, settling impurities from a moving column of said liquid while retaining it under pressure, and separately collecting the heavier and lighter impurities, as set forth.

3. The herein-described method of treating impure saccharine solutions, which consists in heating the same to a temperature above their atmospheric boiling-point to coagulate impurities contained therein, and settling said impurities from a moving column of said solution while retaining the same under pressure, as set forth.

4. The herein-described method of treating impure saccharine solutions, which consists in heating the same to a temperature above their atmospheric boiling-point to coagulate impurities contained therein, settling said impurities from a moving column of said solution while retaining the same under pressure, and separately collecting the heavier and lighter impurities, as set forth.

5. The herein-described method of separating solids from liquids, which consists in maintaining the liquid at a pressure above normal and at a temperature above its atmospheric boiling-point, and settling the solids from a moving column of said liquid, as set forth.

6. The herein-described method of separating solids from liquids, which consists in maintaining the liquid at a pressure above normal and at a temperature above its atmospheric boiling-point, settling the solids from a moving column of said liquid, and separately collecting the heavier and lighter solids, as set forth.

In testimony whereof I affix my signature in presence of two witnesses.

EUGENE WATSON DEMING.

Witnesses:
RICHARD PEARCE,
RUFUS E. FOSTER.